United States Patent
Muto et al.

(10) Patent No.: US 6,323,890 B1
(45) Date of Patent: *Nov. 27, 2001

(54) PRINT HEAD AND IMAGE FORMATION APPARATUS

(75) Inventors: Kenji Muto, Mishima; Izumi Narita, Shizuoka-ken, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,176

(22) Filed: May 11, 1998

(30) Foreign Application Priority Data

May 13, 1997 (JP) ..................................................... 9-122259

(51) Int. Cl.⁷ .................................................. B41J 2/435
(52) U.S. Cl. ........................................... 347/237; 347/238
(58) Field of Search ..................................... 347/237, 238, 347/41, 43, 130, 132

(56) References Cited

U.S. PATENT DOCUMENTS

| 5,371,608 | 12/1994 | Muto et al. | 358/412 |
| 5,455,681 | * 10/1995 | Ng | 358/300 |
| 5,598,192 | * 1/1997 | Burger et al. | 347/43 |
| 5,745,131 | * 4/1998 | Kneezel et al. | 347/40 |
| 5,818,501 | * 10/1998 | Ng et al. | 347/238 |
| 5,956,056 | * 9/1999 | Kaneko et al. | 347/43 |

* cited by examiner

Primary Examiner—N. Le
Assistant Examiner—Lamson D. Nguyen
(74) Attorney, Agent, or Firm—Fitzpatrick, Cella, Harper & Scinto

(57) ABSTRACT

An optical print head and an image formation apparatus which can form a satisfactory image without shortening an exposure time in an image processing at high speed. A satisfactory image is formed at high speed by alternately radiating a first light emitting element array and a second light emitting element array under a predetermined driving condition depending on a relation between a distance d in a Y direction between elements perpendicular to an array direction X of light emitting elements and an image resolution pitch P by using the optical print head composed of two light emitting element arrays.

8 Claims, 17 Drawing Sheets

PRINT HEAD AND IMAGE FORMATION APPARATUS

BACKGROUND OF THE INVENTION

1. Field of the Invention

The present invention relates to an optical print head used as a light source of an exposure system and an image formation apparatus such as a printer, a facsimile apparatus, a copy machine and the like for forming a monochrome image and a color image.

2. Related Background Art

Conventionally, an electrophotographic system is used in a large number of image formation apparatuses such as a printer, a facsimile apparatus, a digital copy machine and the like. That is, the electrophotographic system is a system in which a latent image is formed on an image support body in response to an image signal outputted from an external computer or an image reading device. As an exposure system for this system, an optical print head which is composed by a light source obtained by arraying light emitting elements such as light emitting diodes or the like is often used. As compared with a print head using laser, the optical print head is compact in size. Thus, it is possible to easily constitute a silent image formation apparatus.

The light emitting elements in this optical print head are composed of light emitting diodes or the like. Since the element irradiates spread light from a certain point or surface, the spread light irradiated from the light emitting element has to be formed as a focused image on each microscopic spot in order to form the latent image on the image support body. For this reason, the optical print head is frequently provided with an image-formation element array represented by a rod lens array.

However, a number of the image-formation element arrays merely condense a part of the light spread from the light emitting element. Therefore, the exposed light quantity becomes considerably small as compared with the entire light quantity spread from the light emitting elements.

On the other hand, a high-speed image formation apparatus has been recently required. In a case where image formation is performed at high speed, since an exposure time of the light irradiated from the light emitting element becomes short, there is some fear that the sufficient exposure light quantity cannot be rendered and thus a successful latent image cannot be obtained.

SUMMARY OF THE INVENTION

An object of the present invention is to form a satisfactory image even in high speed image formation by using sufficient recording energy, and to provide an optical print head and an image formation apparatus capable of reducing a load.

An another object of the present invention is to form an image at various resolution pitches.

A still another object of the present invention is to expand an allowable range of assembling error of an apparatus.

According to the present invention, in the print head which provides, substantially in parallel, plural recording element arrays each containing plural recording elements arranged in array, each recording element array is alternately driven every one line.

Further, according to the present invention, in the image formation apparatus which forms an image on an image support body by using the print head having substantially in parallel the plural recording element arrays, each array containing the plural recording elements arranged in array, each recording element array is alternately driven every one line.

Other objects, features and advantages of the present invention will become clear from the description thereof in the following specification and the accompanying drawings.

BRIEF DESCRIPTION OF THE DRAWINGS

FIG. 17 is an explanatory view showing image data stored in an image data storage unit.

DETAILED DESCRIPTION OF THE PREFERRED EMBODIMENTS

Hereinafter, the embodiments of the present invention will be described in detail with reference to the accompanying drawings.

The first embodiment will be described with reference to FIGS. 1A to 8.

Figure 6:
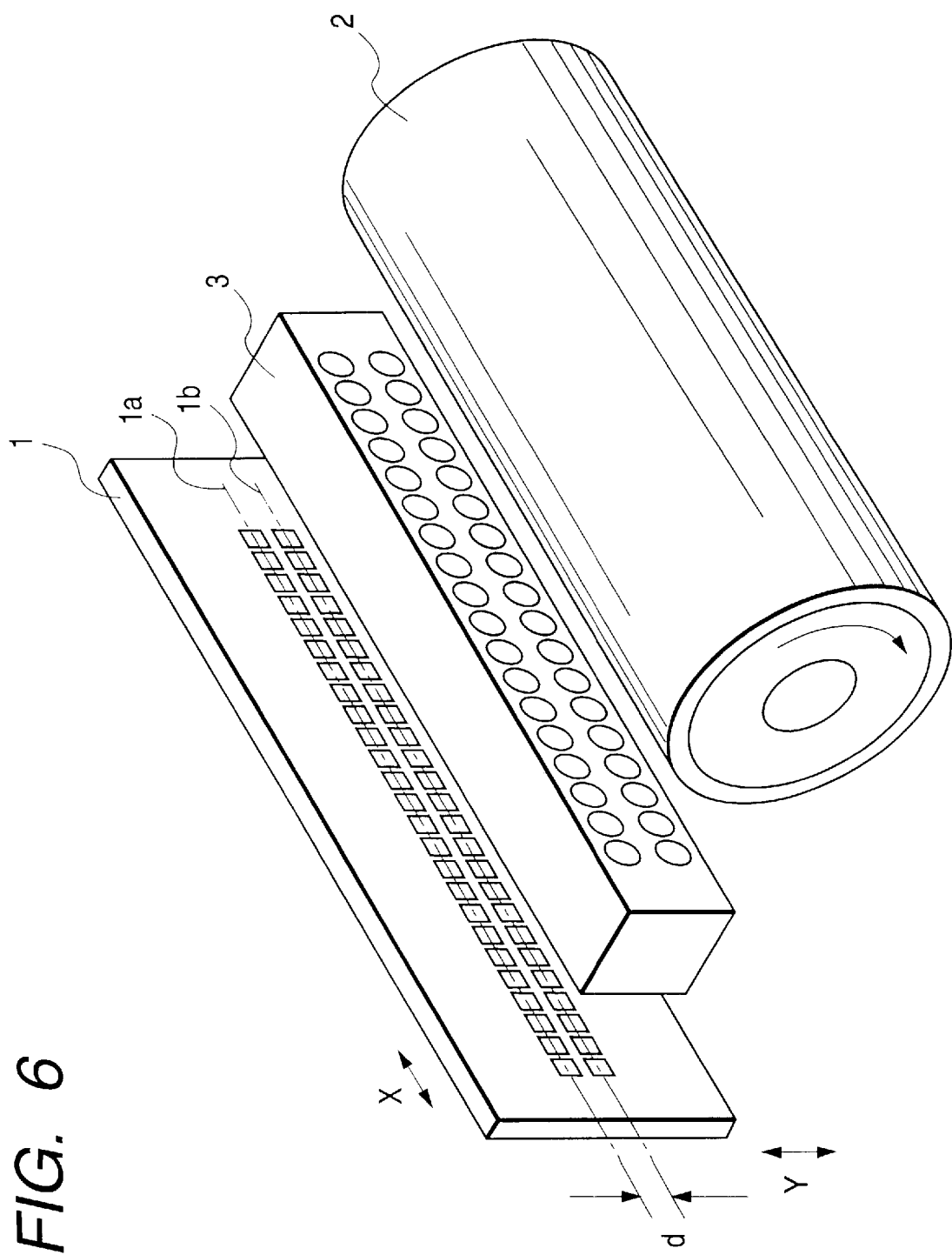
FIG. 6 is a perspective view showing a schematic appearance of the light emitting array provided in the optical print head and indicating arrangement relation between an image formation means and an image support body.
Figure 7:
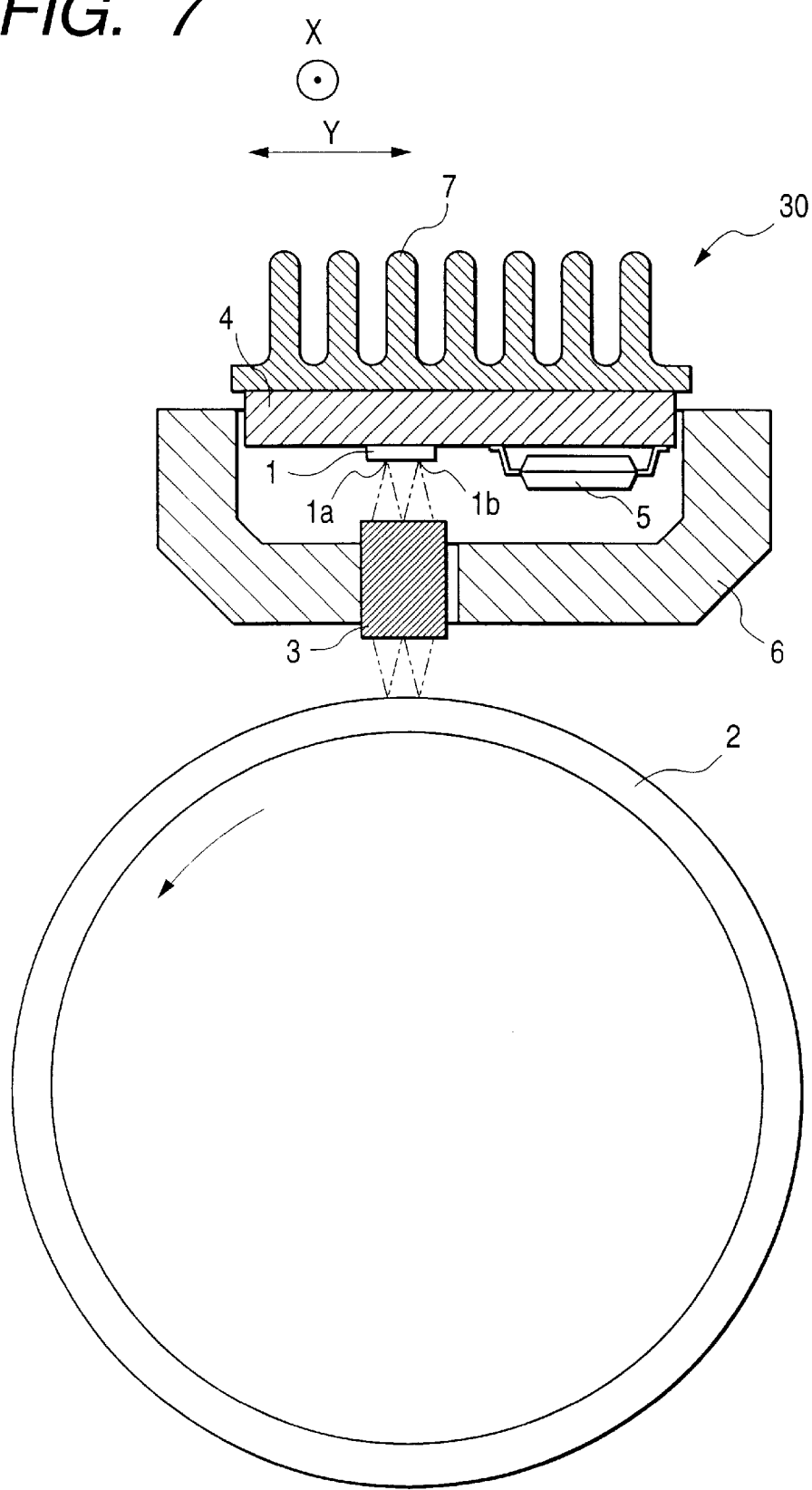
FIG. 7 is a cross-sectional view showing the optical print head and the image support body.
Figure 8:
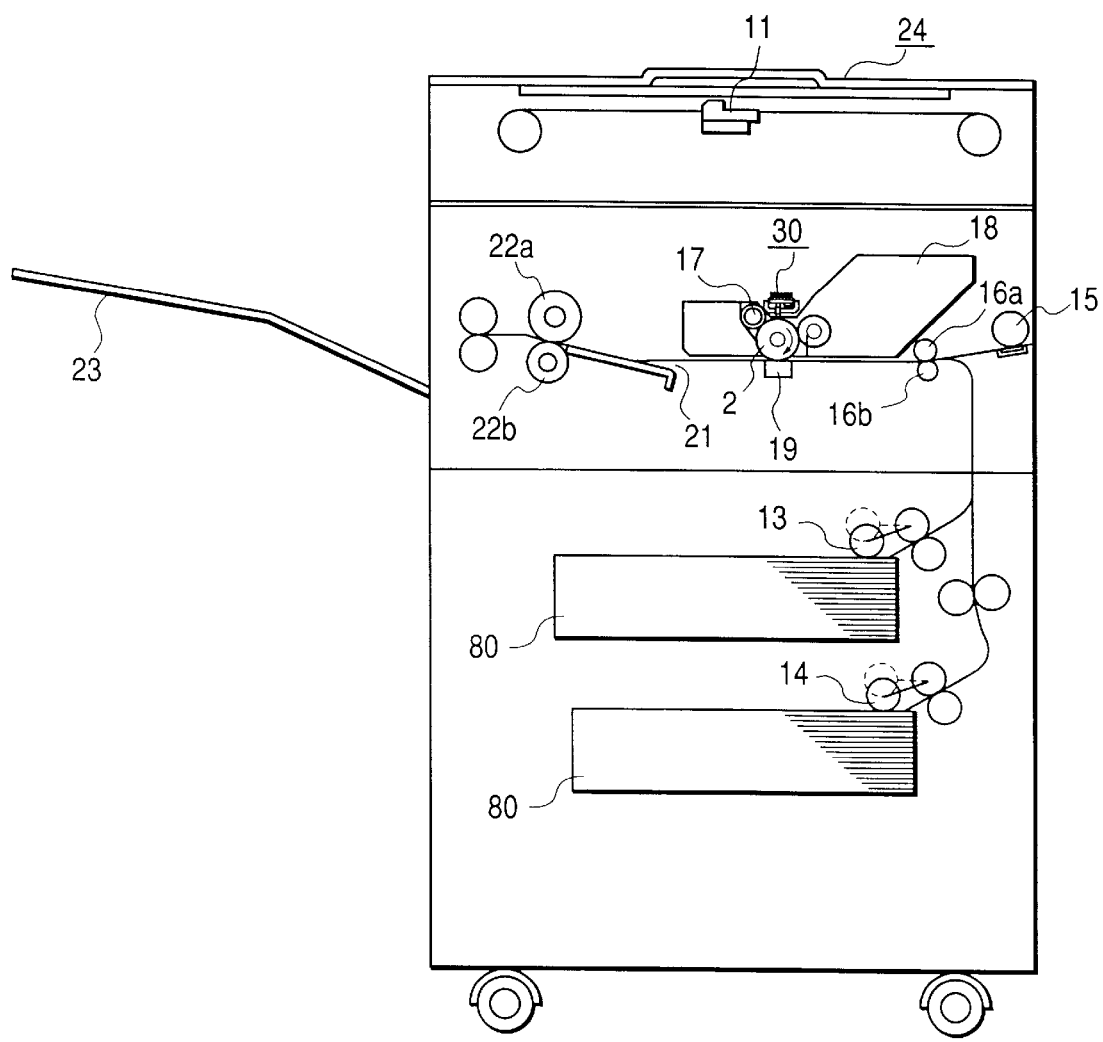
FIG. 8 is a front view showing an example of an image formation apparatus in which the optical print head is mounted.

Initially, the entire structure of the apparatus will be schematically explained with reference to FIGS. 6 to 8. It should be noted that, in this embodiment, an example utilizing a light emitting element as a recording element will be described. FIG. 6 shows schematic appearance of light emitting element arrays 1a and 1b provided in an optical print head and the arrangement relation between a rod lens array 3 being an image-formation means and an image support body 2. FIG. 7 is a detailed cross-sectional view of the optical print head and the image support body 2 which is exposed by the optical print head 30. FIG. 8 shows an example of an image formation apparatus on which the optical print head 30 is mounted.

In FIG. 6, a distance d (in a direction Y perpendicular to an array direction X of the light emitting element arrays 1a and 1b formed on a chip 1 of the optical print head 30 shown in FIG. 7) is, e.g., half as large as an image resolution pitch P on the image support body 2 in the direction Y perpendicular to the light emitting element arrays 1a and 1b (d=0.5P). As light emitting elements constituting the light emitting element arrays 1a and 1b, a light emitting diode or the like may be used.

As shown in FIG. 6, the array direction X of the light emitting element arrays 1a and 1b is parallel to a rotational axis of the columnar image support body 2. The rod lens array 3 between the chip 1 and the image support body 2 has two arrays consisting of a large number of rod lenses arranged in parallel to the light emitting element arrays 1a and 1b. Luminous flux spread from the light emitting element arrays 1a and 1b is accurately located on a position where an image is formed as a microscopic spot on a surface of the image support body 2.

As shown in FIG. 7, in the optical print head 30, the chip 1, a driver chip 5 for driving each light emitting element, limited resistors (not shown) and the like are mounted on an electric substrate 4. The electric substrate 4 is fixed to a member 7, which has a heat radiating effect, by means such as adhesive, vises (screws) or the like. The rod lens array 3 is fixed to a cover 6, which is for preventing the leakage of light from the light emitting element arrays 1a and 1b, and is accurately located at a position where an image is formed as a microscopic spot on a surface of the image support body 2.

The optical print head 30 is included in the image formation apparatus as an exposure device as shown in FIG. 8.

Here, such an example as adapted to a copy machine, which forms an image by reading an original as the image formation apparatus, will be explained.

In FIG. 8, an original put on an original mounting board 24 is read by a reading system 11 composed of a CCD image sensor or the like to be converted into image data. On the other hand, a recording material 80 is fed through feed rollers 13 and 14 in the main apparatus or externally through a feed roller 15. A leading edge of the recording material 80 is detected by a sensor (not shown) to stop the recording material momentarily when the recording material 80 reaches resist rollers 16a and 16b. Thereafter, the recording material is fed by the resist rollers 16a and 16b at certain timing. On the other hand, the image support body 2 charged by a charger 17. As the image support body 2 is rotated in the direction of an arrow mark shown in FIG. 8 the optical print head 30 performs an exposure in accordance with the above-described image data, then, and a latent image is formed. According to the latent image, a development agent (not shown) is given on a surface of the image support body 2 from a development unit 18. The image support body 2, to which the development agent is given until a position of surface of a transfer unit 19, is rotated, and the recording material 80 reaches a surface of the transfer unit 19 simultaneously. Then, the development agent is transferred on the recording material 80 by the transfer unit 19. Subsequently, the recording material 80 reaches fixing units 22a and 22b passing through a feeding path, the transferred development agent is fixed on the recording material 80, and the obtained material 80 is discharged to a tray 23 to terminate the image formation.

Figure 2A:
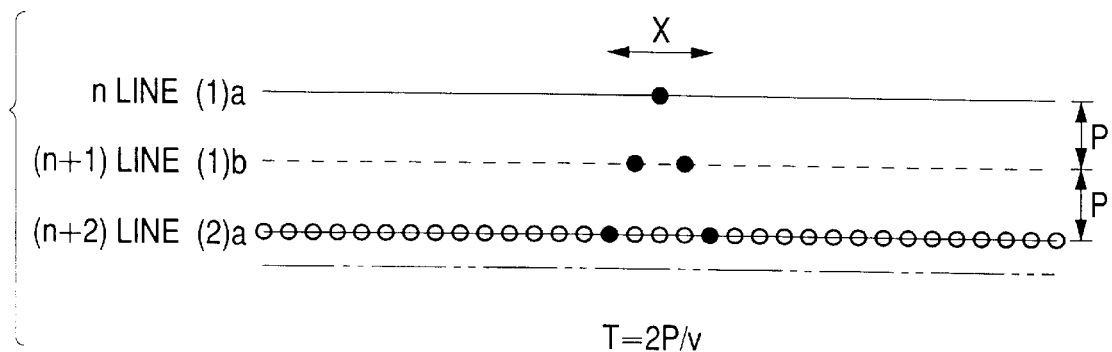
FIGS. 2A and 2B are explanatory views showing the exposure order following after the order shown in FIGS. 1A and 1B.
Figure 2B:
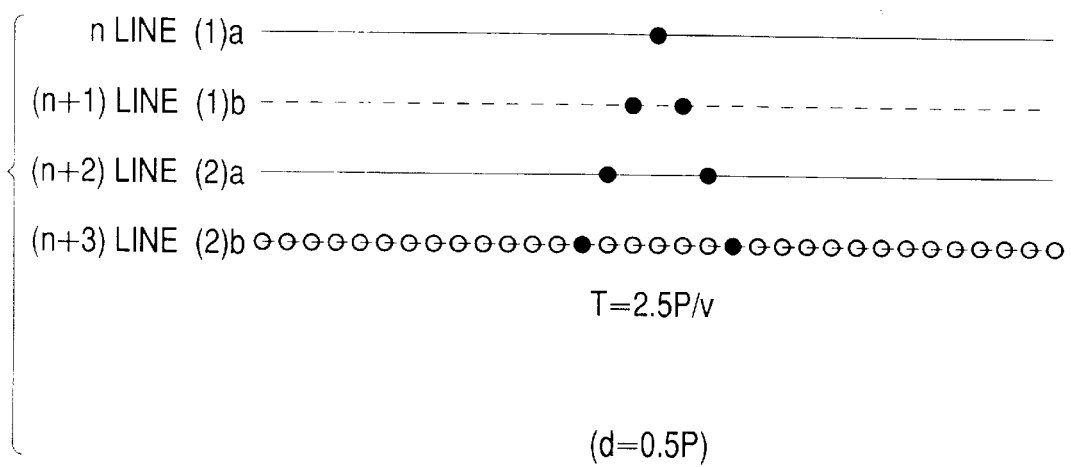
Figure 3:
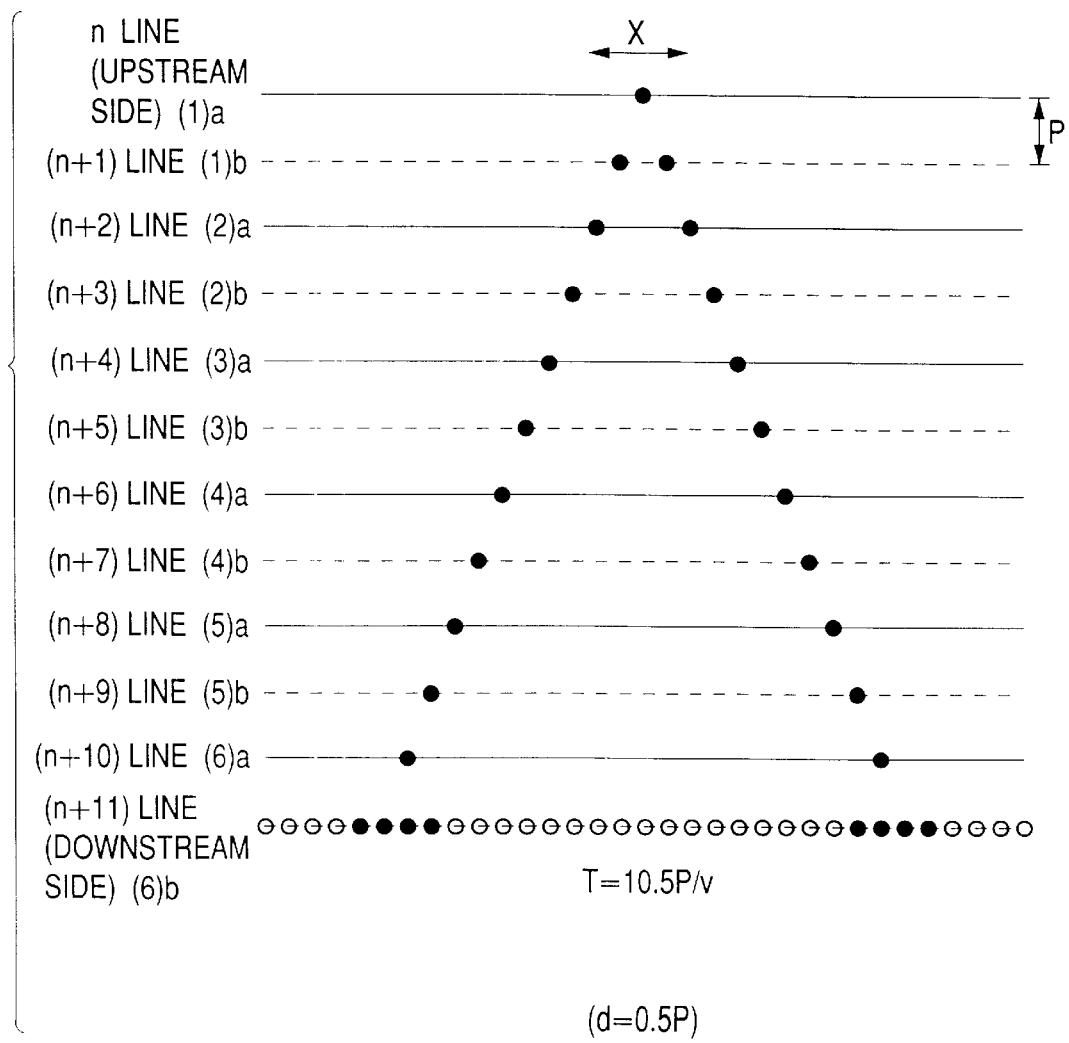
FIG. 3 is an explanatory view showing the exposure order following after the order shown in FIGS. 2A and 2B.
Figure 4:
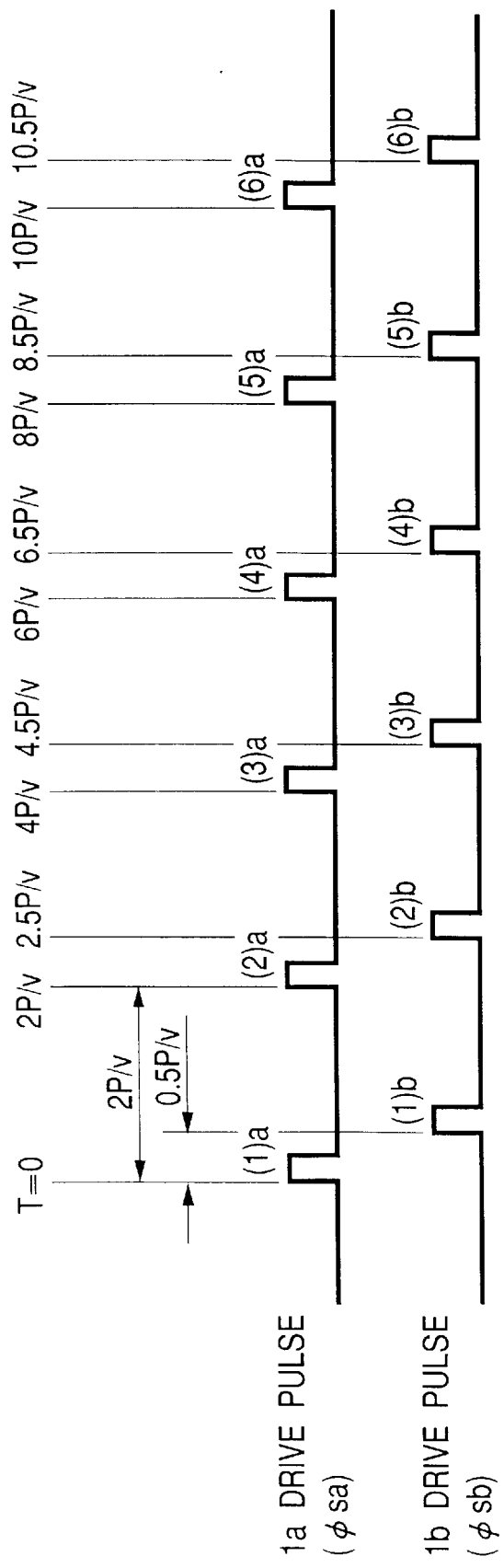
FIG. 4 is a timing chart showing light emission timing of a light emitting element array provided in the optical print head.

Subsequently, exposure order of the light emitting element arrays 1a and 1b in the optical print head 30 will be expla ined with reference to FIGS. 1A to 5. FIGS. 1A to 3 show exposure patterns formed by the drive of the optical print head 30. FIG. 4 shows light emission timing of the two light emitting element arrays 1a and 1b. Each of light emitting element arrays 1a and 1b is synchronized with pulses φsa and φsb respectively for starting to record for one line.

FIGS. 1A to 3 are respectively used to explain the sequential operation in chronological order. Reference numerals (1), (2), (3), . . . denote the exposure order for each exposure line and attached characters a and b denote to which of light emitting element arrays 1a and 1b a line is exposed. As an auxiliary means, an exposure line exposed by the light emitting element array 1a is indicated by a solid line and an exposure line exposed by the light emitting element array 1b is indicated by a dotted line. As to the exposure line on which a large number of white circle marks (○) are given, it is indicated that exposure is performed at that time in each drawing, and black circle marks (●) on each line denote that data to be recorded on the image support body 2 or data already recorded exists. A reference character P denotes the image resolution pitch on the image support body 2, the which direction Y of which is perpendicular to the array direction X of the light emitting element arrays 1a and 1b, and a reference character v denotes rotation speed of the image support body 2. FIG. 4 shows an input pulse for determining the light emission timing of the light emitting element arrays 1a and 1b from an upper current side (light emitting element array 1a side of a first array). Here, although it is expressed that as a single pulse per one line drawing, in case of performing transmission within each of the light emitting element arrays 1a and 1b, plural pulses may be acceptable.

Also, a sign of a pulse may be positive or negative. A concrete operation will be explained hereinafter.

Figure 1A:
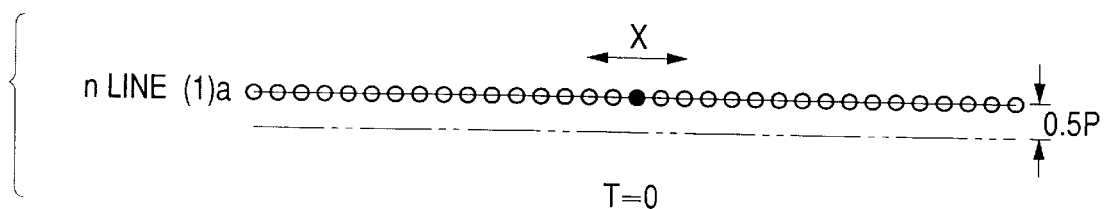
FIGS. 1A and 1B are explanatory views showing exposure order responding to the drive of an optical print head according to a first embodiment of the present invention.
Figure 1B:
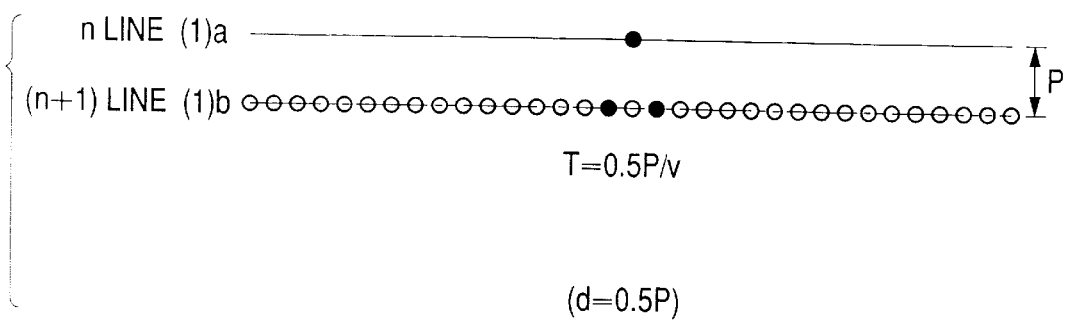

Initially, a first exposure line (1)a in FIG. 1A is recorded on the image support body 2 by the light emitting element array 1a by setting the pulse φsa in FIG. 4 positive at the time T=0 and giving image data of n-th line to the light emitting element array 1a. At this time T=0, relative position from the exposure line (1)a to the light emitting element array 1b is exposure line (1)a as shown by a two-dotted chain line in FIG. 1A. In FIG. 4, at the time T=0.5P/v, the light emitting element array 1b reaches a position having a distance P from the exposure line (1)a by moving the image support body 2 at the rotation speed V. Then, the light emitting element array 1b is radiated by setting the pulse φsb positive and giving image data of (n+1)-th line to the light emitting element array 1b as shown in FIG. 4 to perform line formation of the exposure line (1)b in FIG. 1B. The pulse φsa becomes 0 before reaching the time T=2P/v. At the time T=2P/v, since the light emitting element array 1a is relatively located in a position having a distance 2P from the exposure line (1)a, an exposure line (2)a is formed as shown in FIG. 2A by setting the pulse φsa positive again and giving image data of (n+2)-th line to the light emitting element array 1a.

As shown in FIG. 4, each of the light emitting element arrays is alternately driven by alternately giving each of the start pulses φsa and φsb with a predetermined different time, so that a difference of light emission timing ΔT between the light emitting element array 1a and the light emitting element array 1b becomes 0.5P/v (ΔT=0.5P/v). Thus, at the time T=10.5P/v, an image depending on two sets of six lines (total twelve lines) is formed as shown in FIG. 3.

Each start pulse instructs start timing for forming an image of each line, and actual image formation of each one line may be performed in a period of time from a time when the start pulse is given and to a time when a next start pulse is similarly given to the light emitting element arrays. That is, the image formation can be maximumly performed in the time 2P/v.

For example, in a print head having only one array of the recording elements, in a case where an image with resolution P identical with that in the above-described example is realized with the same image formation speed v, image formation of one line has to be completed within a time P/v. Therefore, in this example, because of providing two arrays of the recording elements, twice recording time, i.e., twice recording energy, can be given as compared with the case of being provided one array of the recording elements, whereby a satisfactory image can be formed at high speed.

Figure 5:
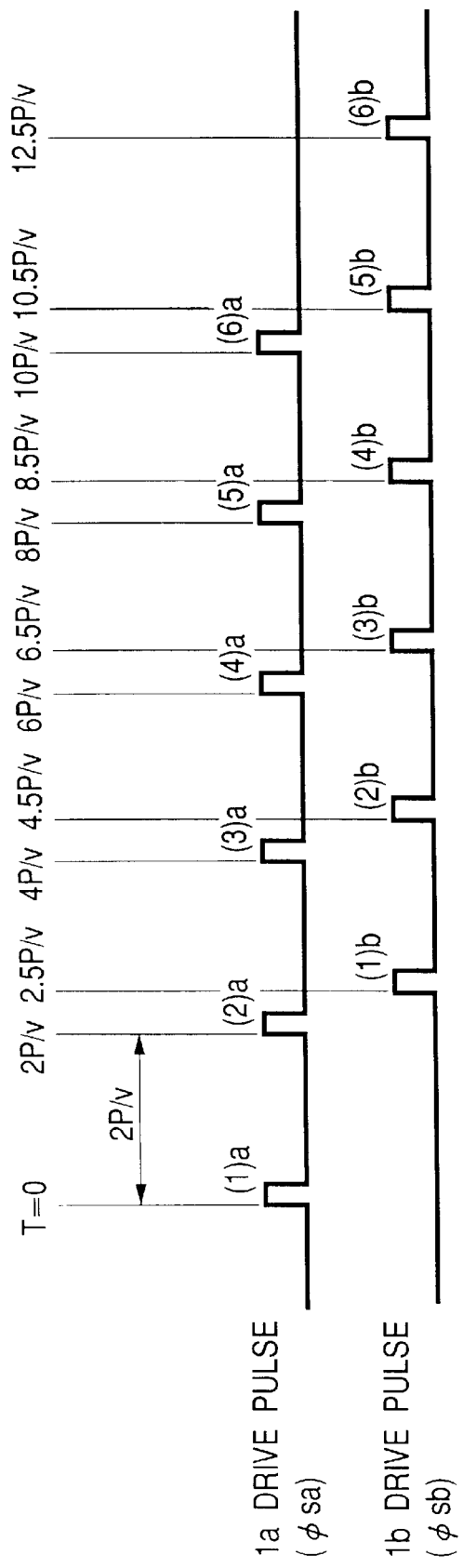
FIG. 5 is a timing chart showing another example of the light emission timing of the light emitting element array provided in the optical print head.

FIG. 5 shows an example in which a distance d between the light emitting element array 1a and the light emitting element array 1b is different from the above-described example. For example, it is assumed that the distance d is set to be 2.5P. Thus, even if ΔT=2.5P/v, an image can be formed. However, since an exposure line (1)b is formed (i.e., positioned) next to the exposure line (2)a, data formation is different from the above example. Since a distance between the exposure line (1)a being a start line and the exposure line (2)a being a next line is 2P and the resolution thereof is different from that of another position, actual exposure for the exposure line (1)a is not performed. According to the same reason, an exposure line (6)b being a final line is not used for the exposure.

As described above, as the light emitting element, the light emitting diode can be used, and further a self-scanning recording element chip can be used. The self-scanning recording element chip having plural light emitting thyristor arrays capable of electrically controlling a threshold voltage or a threshold current performs self-scanning depending on a two-phase transmission clock by alternately connecting neighborhood light emitting thyristors with an electric element having a unidirectional characteristic in voltage or current. The thyristor structure will be explained later.

In this manner, since an image of which resolution is less than d can be formed using two arrays of recording element arranged with distance d=2.5P, it becomes possible to give free allowance in designing the print head as compared with the case of d=0.5.

Consequently, while permitting free allowance in designing the chip 1 of the light emitting element arrays 1a and 1b, sufficient exposure, i.e., recording energy, can be given so as to form an image at high speed by using the above-described optical print head 30.

Next, the second embodiment of the present invention will be explained with reference to FIGS. 9A to 13.

Figure 10A:
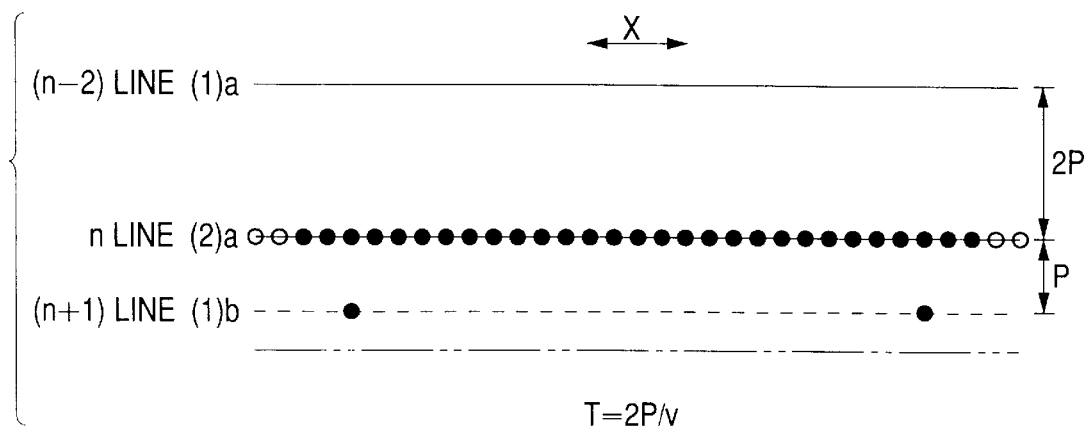
FIGS. 10A and 10B are explanatory views showing the exposure order following after the order shown in FIGS. 9A and 9B.
Figure 10B:
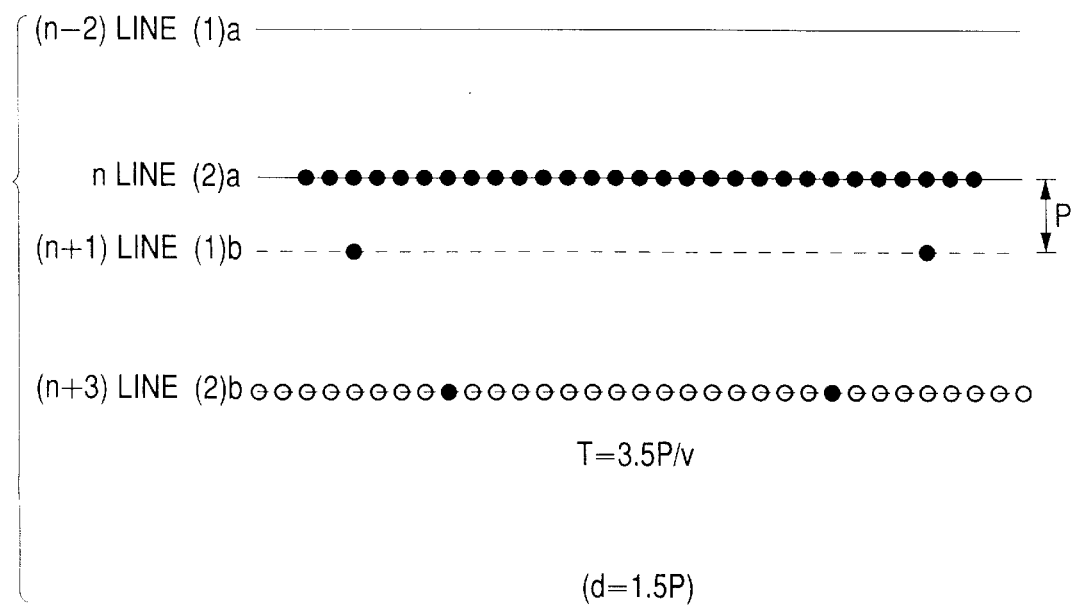
Figure 11:
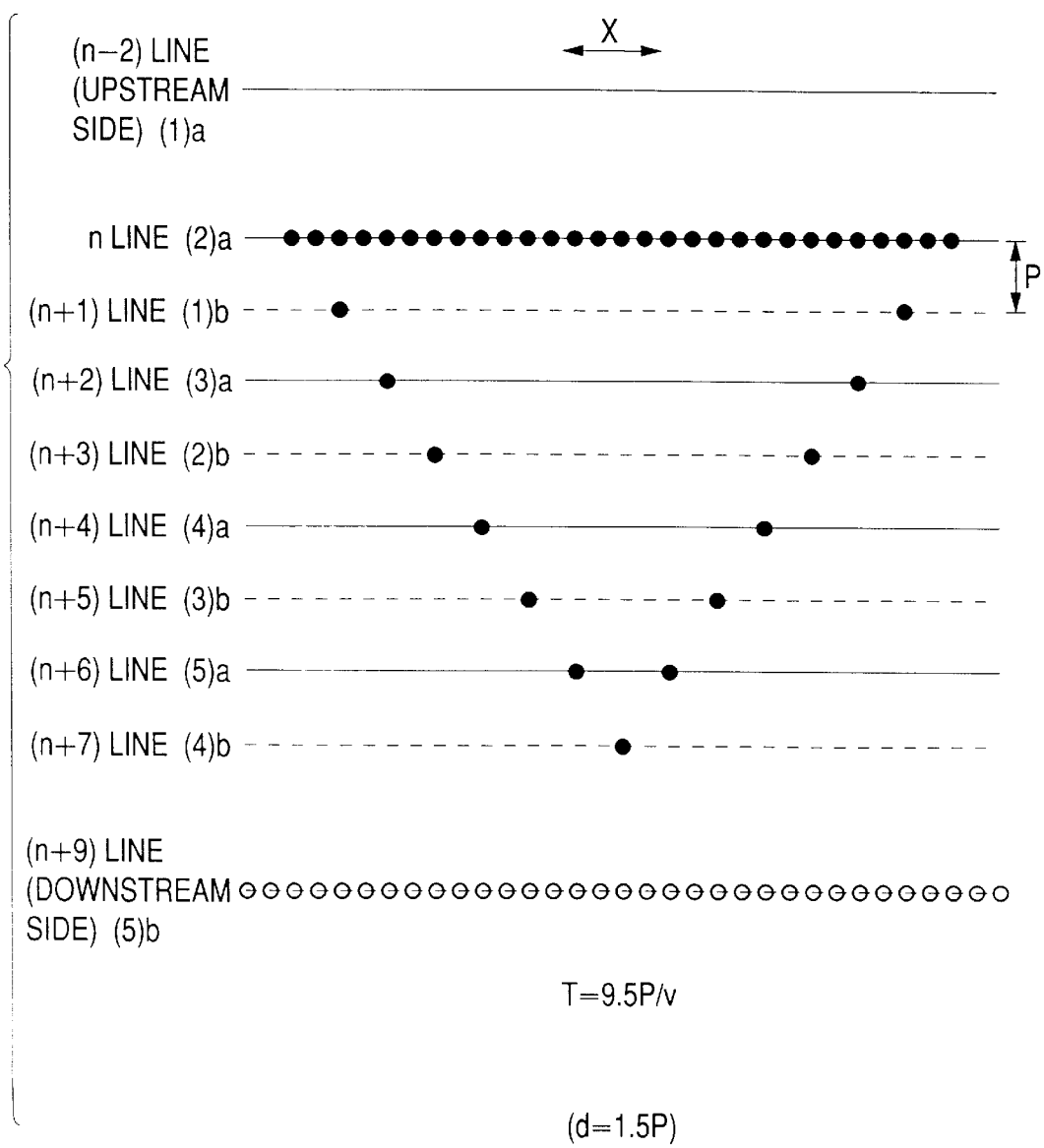
FIG. 11 is an explanatory view showing the exposure order following after the order shown in FIGS. 10A and 10B.
Figure 12:
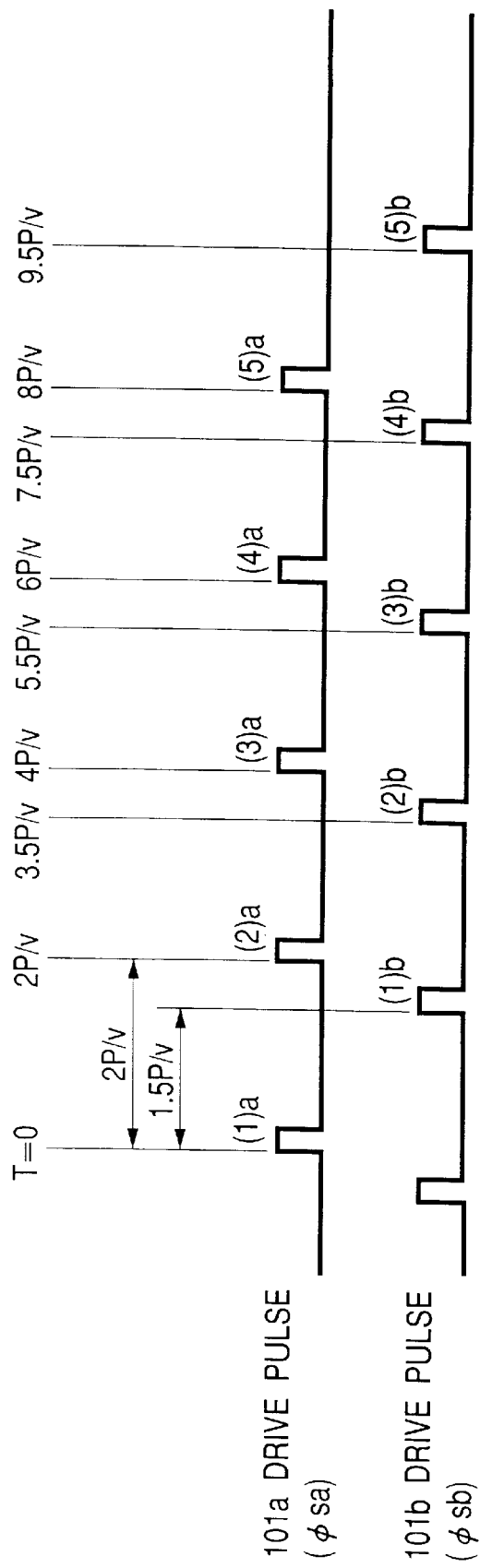
FIG. 12 is a timing chart showing the light emission timing of the light emitting element array provided in the optical print head.
Figure 13:
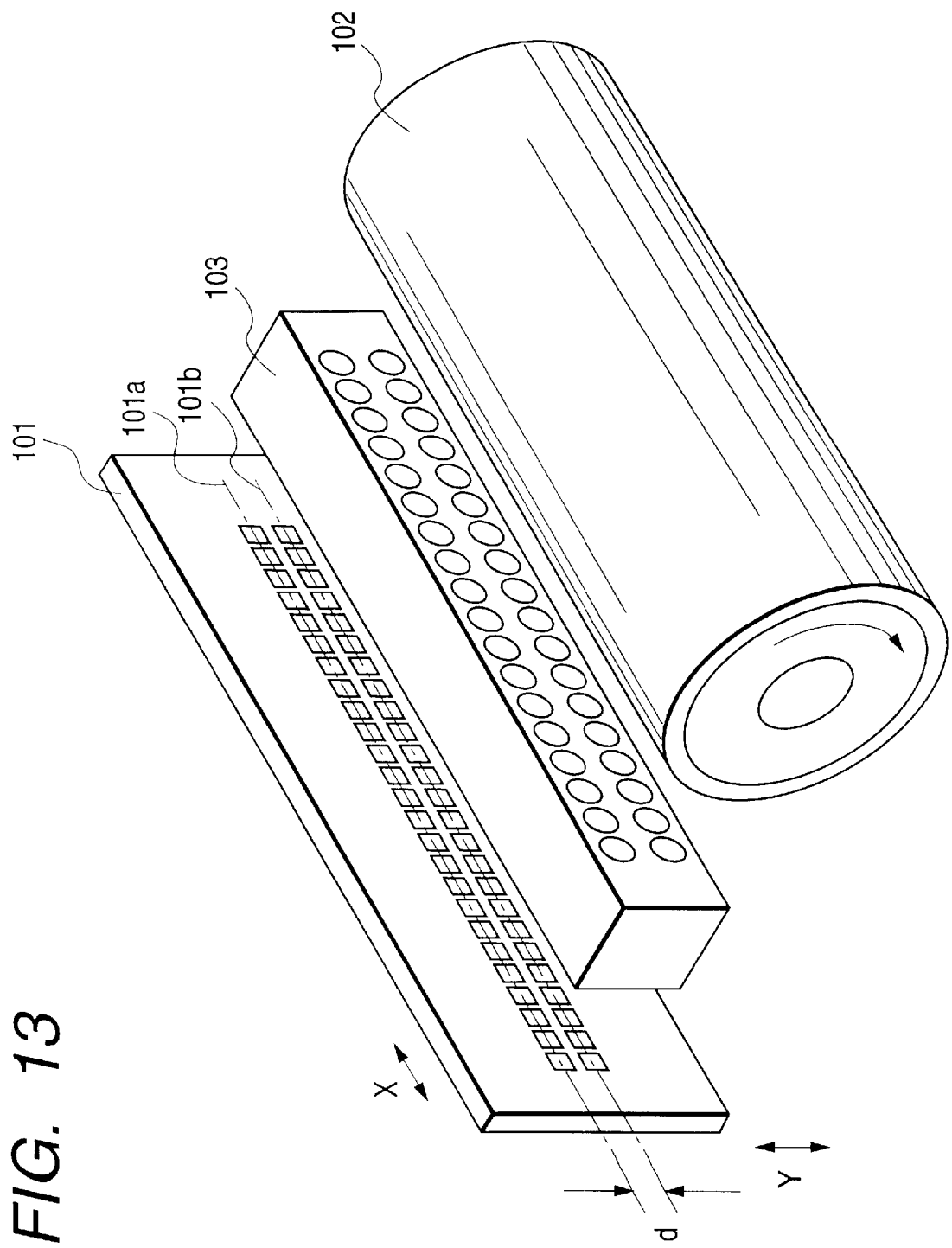
FIG. 13 is a perspective view showing a schematic appearance of the light emitting element array provided in the optical print head and indicating arrangement relation between the image formation means and the image support body.

FIG. 13 shows a schematic appearance of light emitting element arrays 101a and 101b in the optical print head 30 and the arrangement relation between an image-formation means 103 and an image support body 102. FIGS. 9A to 11 show exposure patterns. FIG. 12 shows light emission timing of the light emitting element arrays 101a and 101b.

The structure of the optical print head 30 in the present embodiment is basically identical with that of the above-described first embodiment. As shown in FIG. 13, it is constituted that a distance d (in a direction Y perpendicular to an array direction X of the light emitting element arrays 101a and 101b formed on a chip 101) becomes one and half times as large as an image resolution pitch P (d=1.5P) on the image support body 102 in the direction Y perpendicular to the light emitting element arrays 101a and 101b.

Since the structure of the optical print head 30 including a concrete electric substrate or the like and an example of an image formation apparatus in which the optical print head 30 performs an exposure are same as those in the first embodiment, the description will be omitted in the present embodiment.

Exposure order of the light emitting element arrays 101a and 101b will be explained with reference to FIGS. 9A to 11. FIGS. 9A to 11 are respectively used to explain the sequential operation in chronological. Reference numerals (1), (2), (3), . . . denote the exposure order for each exposure line, and attached characters a and b denote by which of light emitting element arrays 101a and 10b a line is recorded. As an auxiliary means, an exposure line exposed by the light emitting element array 101a is indicated by a solid line and an exposure line exposed by the light emitting element array 10b is indicated by a dotted line. As to the exposure line on which a large number of white circle marks (○) are given, it is indicated that an exposure is performed at that time in each drawing, and black circle marks (●) on each line denote that data to be recorded on the image support body 102 or data already recorded exists. A reference character P denotes the image resolution pitch in the direction Y, perpendicular to the array direction X of the light emitting element arrays 101a and 10b, and a reference character v denotes rotation speed of the image support body 102. FIG. 12 shows an input pulse for determining the light emission timing of the light emitting element arrays 101a and 101b from an upper current side. Here, although it is expressed as single pulse per one line drawing, in case of performing transmission within each of the light emitting element arrays 101a and 101b, plural pulses may be acceptable. Also, a sign of pulse may be positive or negative. A concrete operation will be explained hereinafter.

Figure 9A:
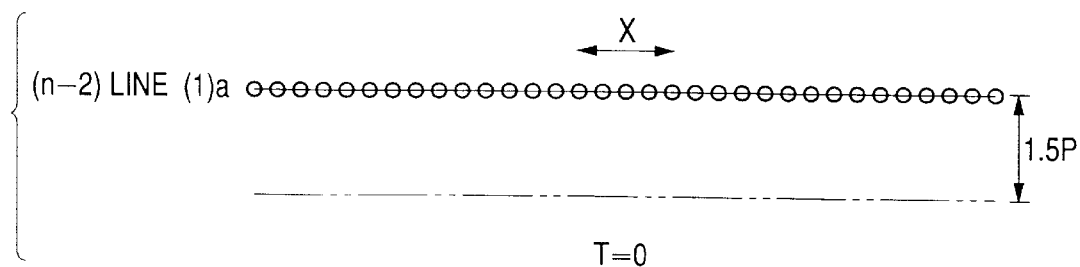
FIGS. 9A and 9B are explanatory views showing the exposure order responding to the drive of the optical print head according to a second embodiment of the present invention.
Figure 9B:
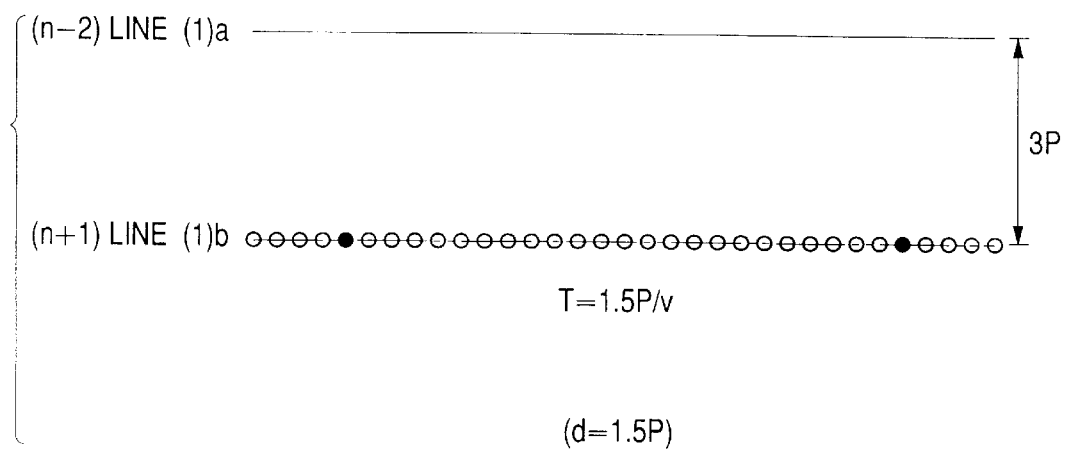

Initially, a first exposure line (1)a in FIG. 9A is recorded on the image support body 102 by the light emitting element array 101a due to the fact that a pulse φsa in FIG. 12 becomes positive at the time T=0. At this time T=0, a distance from the exposure line (1)a to the light emitting element array 10b is 1.5P as shown by a two-dotted chain line in FIG. 9A. In FIG. 12, at the time T=1.5P/v, the light emitting element array 101b reaches such a position as having a distance 3P from the exposure line (1)a by moving the image support body 102 at the rotation speed v. Then, the light emitting element array 101b is radiated by setting a pulse φsb positive and giving image data of (n+1)-th line to the light emitting element array 10b as shown in FIG. 9B to perform line formation of an exposure line (1)b. The pulse φsa becomes 0 before reaching the time T=2P/v, and at the time T=2P/v, since the light emitting element array 101a is relatively located in such a position as having a distance 2P from the exposure line (1)a, an exposure line (2)a is formed as shown in FIG. 10A by setting the pulse φsa positive again and giving image data of n-th line to the light emitting element array 101a.

Hereinafter, as shown in FIG. 12, each of the pulses φsa and φsb is alternately given to form an image sequentially so that a difference of light emission timing ΔT between the light emitting element array 101a and the light emitting element array 10b becomes 1.5P/v (T=1.5P/v). Thus, at the time T=9.5P/v, an image depending on two sets of five lines (total ten lines) is formed as shown in FIG. 11.

However, since a distance between the exposure line (1)a being a start line and the exposure line (2)a being a next line is 2P and the resolution thereof is different from that of another position, actual exposure for the exposure line (1)a is not performed. According to the same reason, an exposure line (5)b being a final line is not used for the exposure.

Like the first embodiment, as the light emitting element, a light emitting diode, and further a self-scanning recording element array chip can be used in this embodiment.

As described above, since the distance d between the light emitting element array 101a and the light emitting element array 101b is set wide in the optical print head 30 of the present embodiment, it becomes possible to increase free allowance further in designing structure within the chip 1. While permitting the free allowance in designing, a satisfactory image can be formed at high speed with sufficient recording energy.

Since the distance d (in the direction Y, perpendicular to the array direction X of the light emitting element arrays 101a and 101b) is maintained as d=1.5P, the distance between the two element arrays can be set wide and the free allowance in designing structure within the chip 1 can be further increased.

In the above-described structure, it becomes possible to perform a recording with plural kinds of resolution pitches by one print head unit. That is, as apparent from the above-described embodiment, since a time difference ΔT of driving timing in each light emitting element array depends on an arrangement distance d of the light emitting element arrays and the resolution pitch P of an image to be recorded, the time difference ΔT becomes a function of P as follows:

$$\Delta T = \Delta T(P) = |(P-d)/v|$$

Here, an image can be recorded with an optional resolution pitch P, for example, by variably controlling the time difference ΔT of driving timing in each light emitting element array upon calculating the above expressed equation in accordance with the resolution pitch P instructed from a console unit or the like.

Next, the circuit structure in the first embodiment will be explained.

In this embodiment, the self-scanning recording element array chip, described later in detail, is adapted in order to realize the light emitting element arrays 1a and 1b. The light emitting element array for one array is realized by arranging, e.g., the self-scanning recording element array chips of 56 pieces in an axis direction of the image support body 2, wherein, e.g., the self-scanning recording element array chip in which light emitting elements of 128 pieces are arranged. The two light emitting element arrays in this embodiment, i.e., the light emitting element arrays 1a and 1b, are realized by arranging two of the above-described light emitting element arrays, substantially in parallel, having the distance d from each other. The circuit structure hereinafter is identical with that in the second embodiment.

Hereinafter, the self-scanning recording element array chip will be explained in detail.

Figure 14:
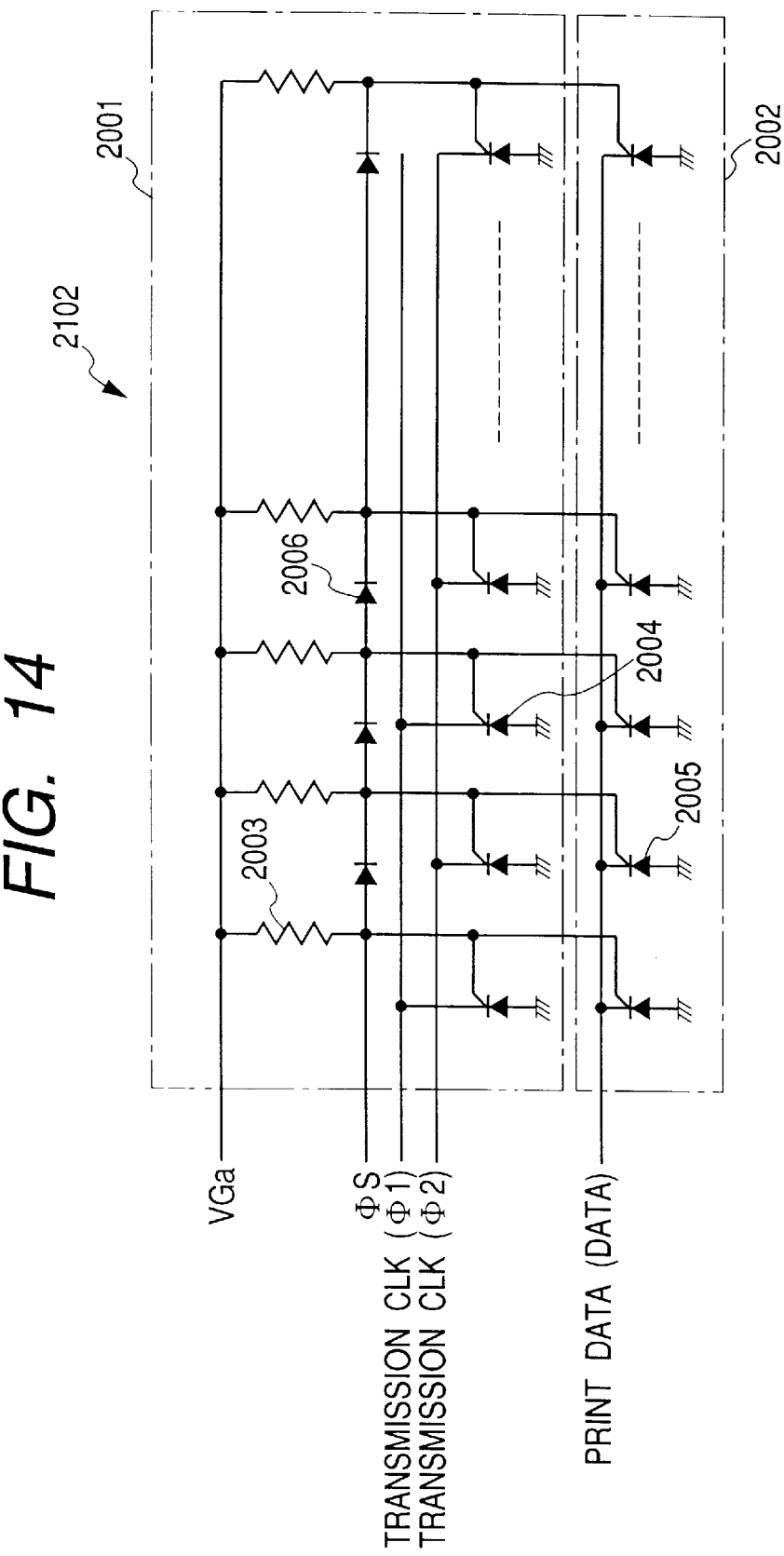
FIG. 14 is a circuit diagram showing the structure of a self-scanning recording element array chip constituted based on thyristor structure.

FIG. 14 shows an equivalent circuit structure of a self-scanning recording element array chip 2102 based on the thyristor structure. This self-scanning recording element array chip 2102 is constructed by a light emitting element array of a self-scanning recording element array composed of thyristors and thus linear light emitting element array being assembled as two light emitting element arrays are arranged on a substrate similar to the case of the chip 1 in FIG. 6 or the chip 101 in FIG. 13.

A reference numeral 2001 denotes a shift register section and a numeral 2002 denotes a light emission unit. A reference numeral 2003 denotes a load resistance and numerals 2004 and 2005 denote thyristors. A gate terminal of each of the thyristors 2004 and 2005 is connected to each other through a diode 2006 and is connected to a power source VGa through the load resistance 2003. A start pulse φS for instructing a recording start for each self-scanning recording element array chip corresponds to the above-described φsa and φsb. Transmission clocks φ1 and φ2 used for a transmission operation are each applied to a cathode of alternate thyristors 2004.

It is assumed that, now, the thyristor 2004 is in an on-state by the transmission clock φ1, and a gate potential thereof becomes nearly 0 volt. This potential has an influence to a right direction through the diode 2006. Since only an element in the right direction is selectively turned on by the next transmission clock φ2, it becomes possible to perform a transmission to the right direction. The thyristor 2005 emits light by applying print data clock (DATA) corresponding to image information at the same time being addressed as in the above description. The light can be emitted from a predetermined thyristor according to image data by repeating thus operation. In this manner, the self-scanning recording element array chip has a scanning function in its chip.

Figure 15:
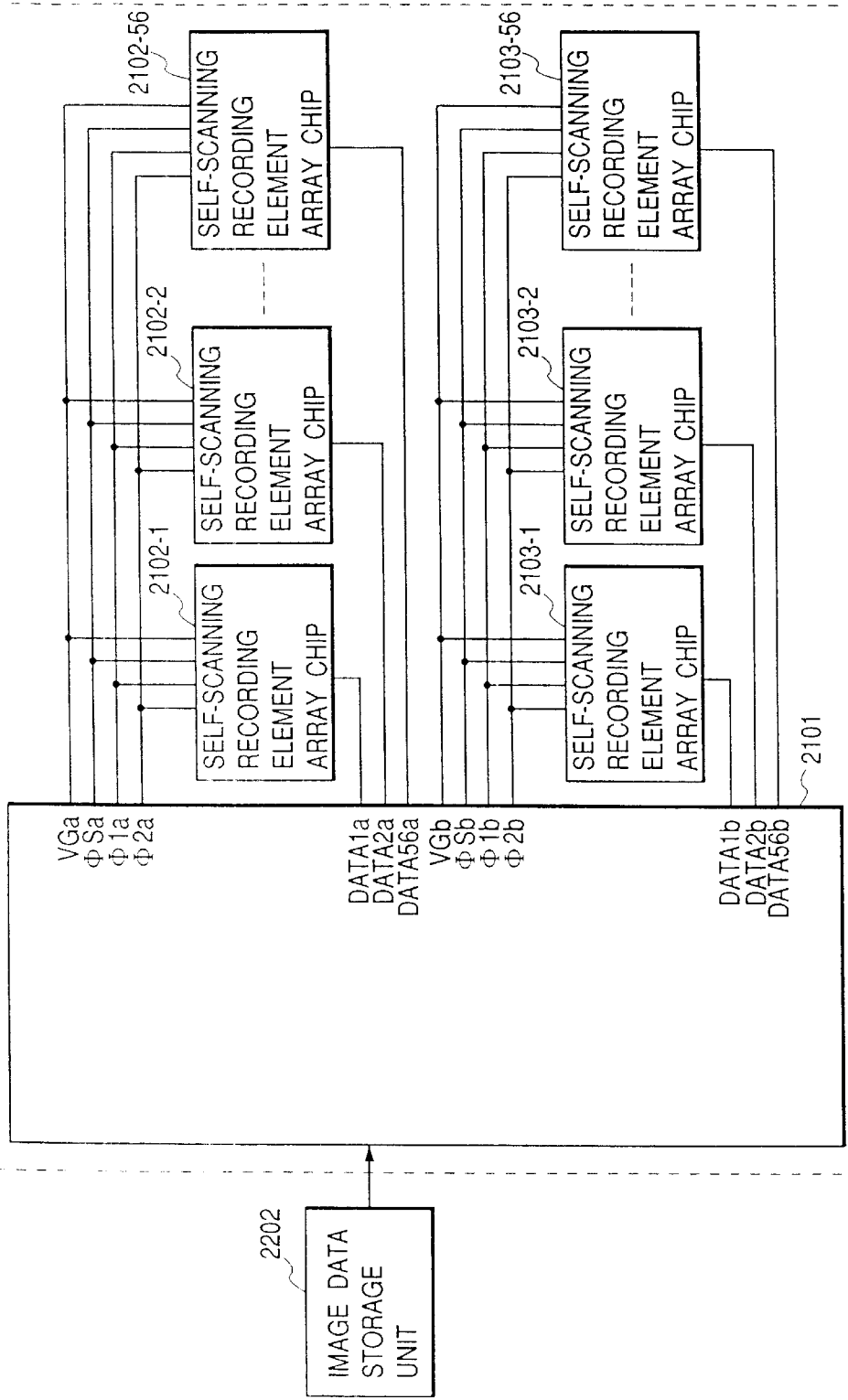
FIG. 15 is a circuit diagram showing the structure of a control system of the self-scanning recording element array.

FIG. 15 is a block diagram for explaining the internal structure of the print head, in which self-scanning recording element array chips 2102-1 to 2102-56 are arranged in an array to construct the recording element array 1a in the first embodiment and self-scanning recording element array chips 2103-1 to 2103-56 are arranged in array to construct the recording element array 1b in the first embodiment.

From a control unit 2101 of the self-scanning recording element array, VGa, φsa, φ1a and φ2a are commonly inputted to the self-scanning recording element array chips 2102-1 to 2102-56 which construct the recording element array 1a, and DATA1a to DATA56a for serially supplying image data to be recorded at the chip are connected to each of self-scanning recording element array chips.

Similarly, from the control unit 2101, VGb, φsb, φ1b and φ2b are commonly inputted to the self-scanning recording element array chips 2103-1 to 2103-56 which construct the recording element array 1b, and DATA1b to DATA56b for serially supplying image data to be recorded at the chip are connected to each of self-scanning recording element array chips.

Figure 16:
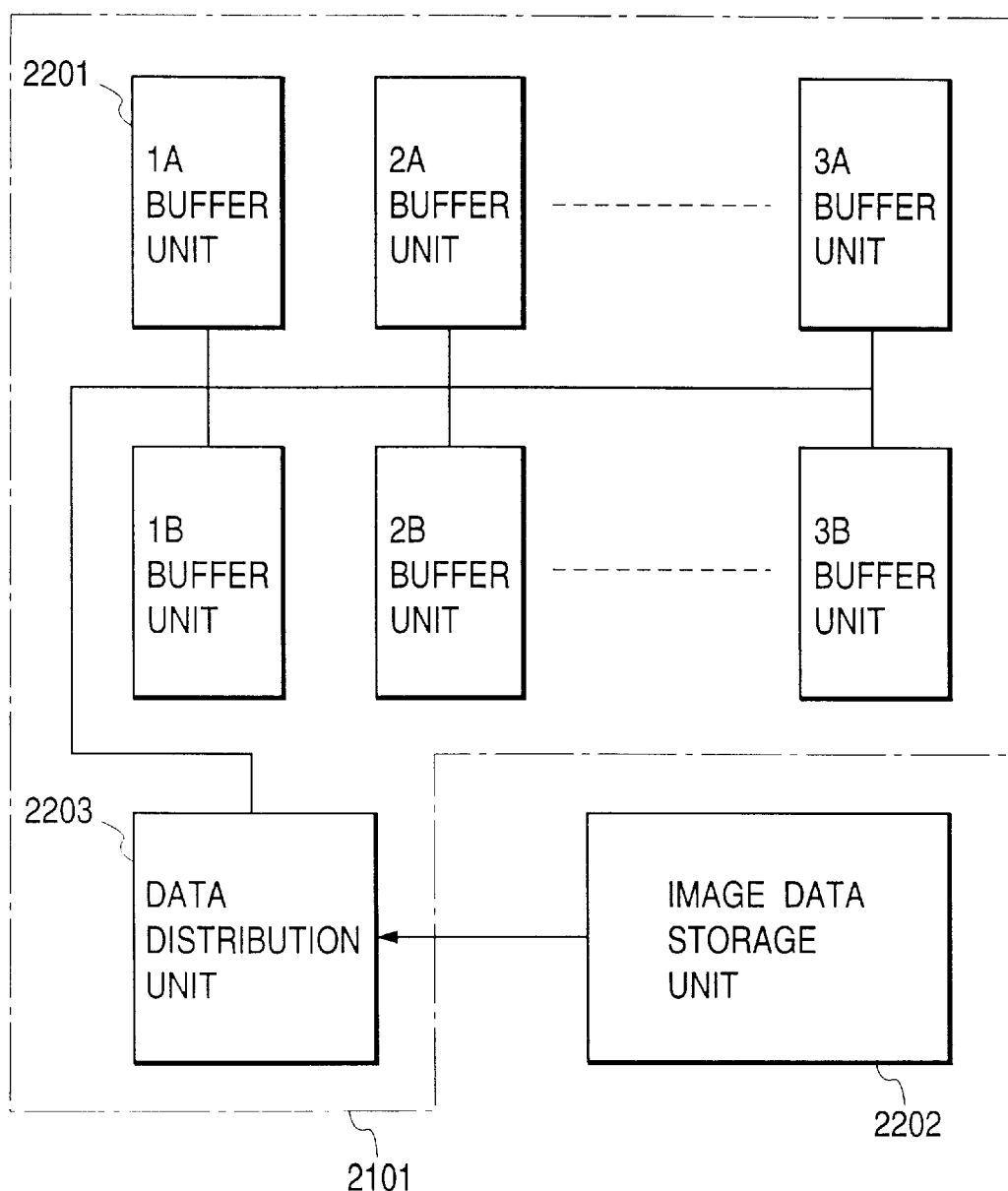
FIG. 16 is a circuit diagram showing the structure of a control unit of the self-scanning recording element array.
Figure 17:
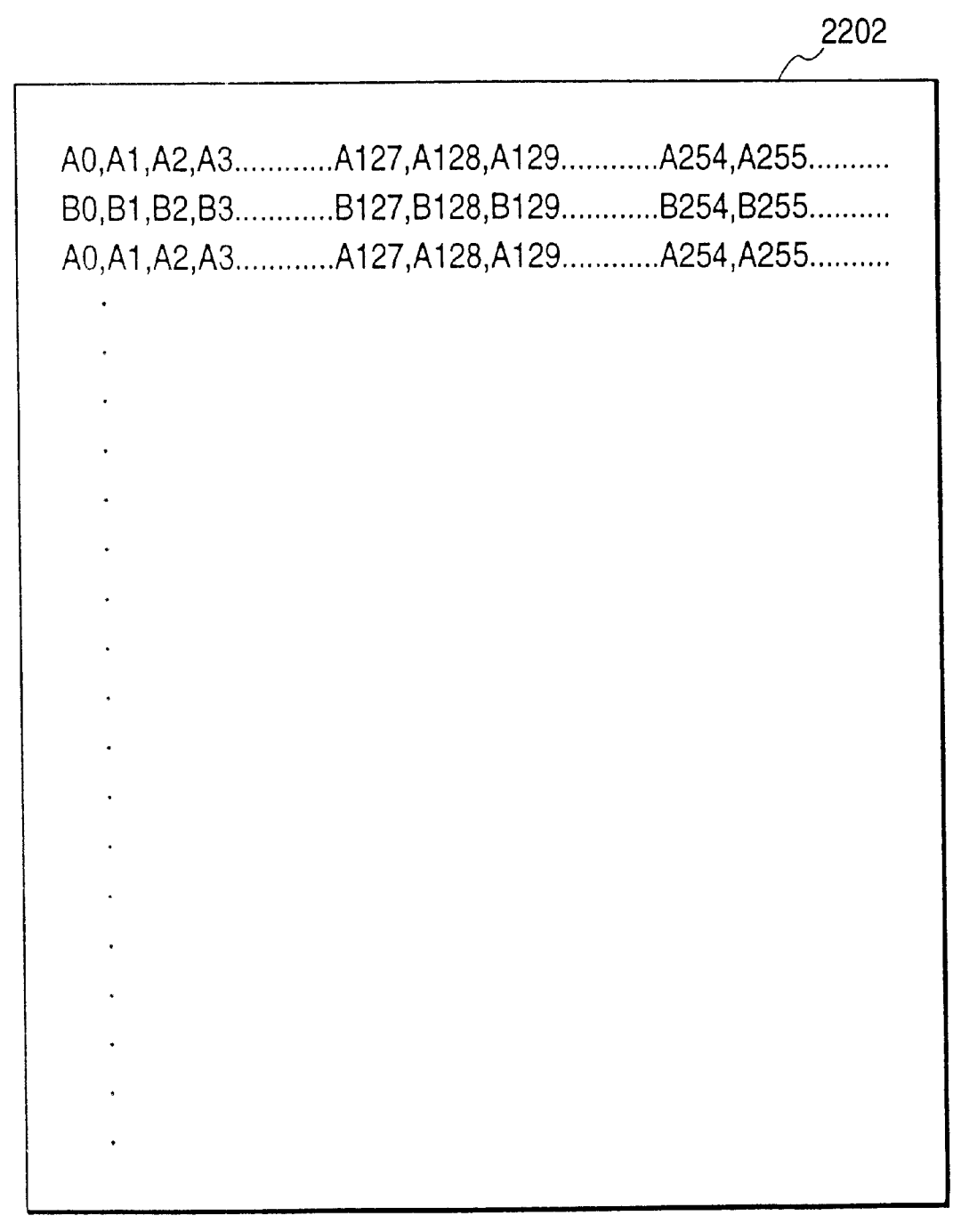

FIG. 16 shows the structure of the above-described control unit 2101. A buffer unit 2201 corresponds to each of the self-scanning recording element array chips 2102. A reference numeral 2202 denotes an image data storage unit and a numeral 2203 denotes a data distribution unit. FIG. 17 shows image data stored in the image data storage unit 2202. Reference numerals AO to A127 denote print data to be printed by the first self-scanning recording element array chip 2102 of a first array. Reference numerals A128 to A255 denote print data to be printed by the second self-scanning recording element array chip 2102 of the first array. Reference numerals BO to B127 denote print data to be printed by the first self-scanning recording element array chip 2102 of a second array. The data distribution unit 2203 distributes this print data to the buffer unit 2201 which corresponds to each of the self-scanning recording element array chips 2102 for adding required clocks as described above and transmitting to each of the self-scanning recording element array chips 2102 together with print data clocks. In this manner, a self-scanning can be performed by transmission clocks φ1 and φ2 of 2-phase.

It should be noted that timing for giving the start pulse and image data corresponded to each line has been described in each embodiment.

In the above embodiments, an example, in which the optical print head arranging light emitting elements in array is used as the recording element and the latent image is formed on the image support body, is described. However, the present invention, of course, can be applied to an another example, in which various recording elements such as a thermal print head arranging heat generating elements in array, an ink jet head or the like is used.

In the above embodiments, an example, in which two of the recording element arrays having the distance d from each other are arranged for performing the drive with the time difference ΔT, is described. However, a recording at more high speed can be performed by arranging recording element arrays of which number is greater than or equal to three having an optional distance dn from each other and driving each of the recording element arrays with a suitable time difference.

Further, in a manufacturing step at a factory, a distance d between two recording element arrays in each of assembled products is measured so as to constitute that a time difference ΔT of driving timing of the recording element arrays can be varied in accordance with the measured distance d, thereby enabling to widen an allowable range of assembling error Adn in the manufacturing step, as a result, a defective product manufacturing ratio can be suppressed for realizing cost reduction.

As described above, according to the present invention, since the recording element arrays are alternately driven under a predetermined driving condition by using the optical print head having plural recording element arrays, even if an image is formed at high speed, sufficient recording energy can be given, thereby enabling formation of a satisfactory image.

Although several preferred embodiments of the present invention have been described above, the present invention is by no means limited to these, and various modifications and arrangements may be made without departing from the scope of the following claims.

What is claimed is:

1. An exposure apparatus for exposing a photosensitive body, comprising:
   a first light emitting element array, opposite to the photosensitive body, including plural light emitting elements;
   a second light emitting element array, substantially in parallel to said first light emitting element array, including plural light emitting elements;
   first drive means for radiating said first light emitting element array;
   second drive means for radiating said second light emitting element array; and
   control means for causing, after a predetermined time elapses from a start of radiating by said first drive means for image formation of one line, a start of radiating by said second drive means for image formation of another line, so that said second light emitting element array forms a latent image line on a position of said photosensitive body between two adjacent latent image lines which have been already formed by said first light emitting element array,
   wherein the predetermined time is adjustable.

2. An exposure apparatus according to claim 1, wherein the predetermined time is changed according to resolution of an image to be printed.

3. An exposure apparatus according to claim 1, wherein the predetermined time is changed according to a distance between said first and second light emitting element arrays.

4. An exposure apparatus according to claim 1, wherein a function for shifting image data to said first and second light emitting element arrays is provided in a chip in which said first and second light emitting element arrays are arranged.

5. An image formation apparatus comprising:
   a photosensitive body;
   an exposure apparatus for exposing said photosensitive body, said exposure apparatus including (i) a first light emitting element array, opposite to said photosensitive body, including plural light emitting elements, and (ii) a second light emitting element array, substantially in parallel to said first light emitting element array, including plural light emitting elements;
   first drive means for radiating said first light emitting element array;
   second drive means for radiating said second light emitting element array; and
   control means for causing, after a predetermined time elapses from a start of radiating by said first drive means for image formation of one line, a start of radiating by said second drive means for image formation of another line, so that said second light emitting element array forms a latent image line on a position of said photosensitive body between two adjacent latent image lines which have been already formed by said first light emitting element array,
   wherein the predetermined time is adjustable.

6. An apparatus according to claim 5, wherein the predetermined time is changed according to resolution of an image to be printed.

7. An apparatus according to claim 5, wherein the predetermined time is changed according to a distance between the first and second light emitting element arrays.

8. An apparatus according to claim 5, wherein a function for shifting image data to the first and second light emitting element arrays is provided in a chip in which the first and second light emitting element arrays are arranged.

* * * * *

UNITED STATES PATENT AND TRADEMARK OFFICE
CERTIFICATE OF CORRECTION

PATENT NO. : 6,323,890 B1
DATED : November 27, 2001
INVENTOR(S) : Kenji Muto et al.

It is certified that error appears in the above-identified patent and that said Letters Patent is hereby corrected as shown below:

Column 1,
Line 21, "by" should read -- of --; and
Line 55, "An another" should read -- Another --.

Column 2,
Line 16, "after" should be deleted.

Column 3,
Line 12, "head" should read -- head 30 --; and
Line 62, "charged" should read -- is charged --.

Column 4,
Line 14, "expla ined" should read -- explained --;
Line 19, "for" should be deleted;
Line 36, "which" (first occurrence) should be deleted;
Line 56, "is" should read -- is such a position as having a distance 0.5P from the --; and
Line 60, "V." should read -- v. --.

Column 5,
Line 7, "AT" should read -- $\Delta T$ --;
Line 17, "maximumly" should read -- maximally --; and
Line 53, "of which" should read -- whose --.

Column 6,
Line 22, "chronological." should read -- chronological order. --;
Line 24, "of" should be deleted;
Lines 25, 29, 52 and 59, "10b" should read -- 101b --;
Line 36, "10b," should read -- 101b, --; and
Line 45, "of" should read -- of a --.

Column 7,
Lines 3 and 34, "AT" should read -- $\Delta T$ --; and
Line 5, "10b" should read -- 101b --.

Column 8,
Line 8, "registor" should read -- register --;
Line 29, "a s" should read -- as --;
Line 60, "AO" should read -- A0 --; and
Line 65, "BO" should read -- B0 --.

UNITED STATES PATENT AND TRADEMARK OFFICE
CERTIFICATE OF CORRECTION

PATENT NO. : 6,323,890 B1
DATED : November 27, 2001
INVENTOR(S) : Kenji Muto et al.

It is certified that error appears in the above-identified patent and that said Letters Patent is hereby corrected as shown below:

Column 9,
Line 15, "an" should be deleted;
Line 18, "is" should read -- are --;
Line 22, "more" should be deleted;
Line 23, "high" should read -- higher --; and
Line 34, "Adn" should read -- Δdn --.

Column 10,
Line 30, "in" should be deleted.

Signed and Sealed this

Eighteenth Day of March, 2003

JAMES E. ROGAN
*Director of the United States Patent and Trademark Office*